_United States Patent Office_ 3,075,004
Patented Jan. 22, 1963

3,075,004
METHOD OF PREPARING A TERTIARY ESTER
Alfred Arkell, Wappingers Falls, and Harry Chafetz, Poughkeepsie, N.Y., assignors to Texaco Inc., New York, N.Y., a corporation of Delaware
No Drawing. Filed Apr. 17, 1961, Ser. No. 103,194
7 Claims. (Cl. 260—488)

The subject invention relates to a method for preparing tertiary (t) esters of a carboxylic acid. More particularly it pertains to a method of preparing t-hydrocarbyl esters by reacting di-t-hydrocarbyl peroxide with carbon monoxide optionally in the presence of a catalyst.

The overall reaction may be generally described by the following chemical equations:

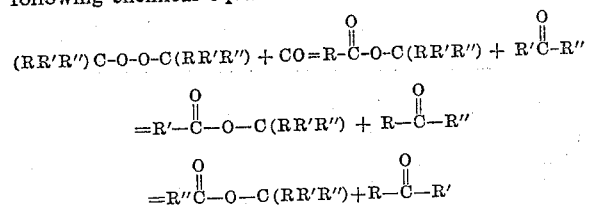

where R, R' and R" are the same or different hydrocarbyl radicals selected from the group consisting of alkyl, aryl, aralkyl and alkaryl having up to nine carbon atoms. Specific examples of R, R' and R" contemplated herein are methyl, ethyl, butyl, phenyl, benzyl and tolyl.

As a specific example, the reaction of di-t-butyl peroxide and carbon monoxide to form t-butyl acetate can be represented as follows:

(a)

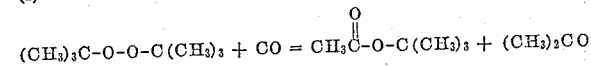

It is thought that this reaction proceeds by the following steps:

(b)  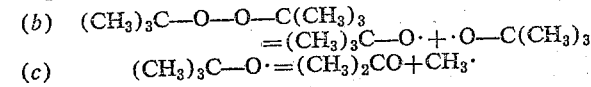

(c)      $(CH_3)_3C\!-\!O\cdot = (CH_3)_2CO + CH_3\cdot$ (d)

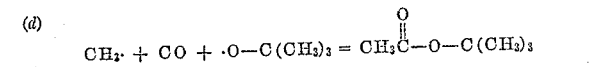

The sum of b, c and d above is equivalent to the overall reaction marked "a."

Tertiary butyl acetate is useful as a paint solvent and as a grease component. In addition it is a valuable additive for improving the octane rating of high quality leaded gasoline. As a group the carboxylic acid esters contemplated herein are solvents for many organic materials and, therefore, are useful as vehicles therefor.

One of the popular methods of producing a tertiary carboxylic acid ester was the reaction of a tertiary olefin (isobutylene) with a carboxylic acid (acetic acid) in the presence of a strongly acidic catalyst such as sulfuric acid, complexes of boron trifluoride, orthophosphoric acid, benzenesulfonic acid, and alkyl sulfuric acid. This popular method although satisfactorily producing tertiary esters (e.g. t-butyl acetate) has the disadvantage of requiring expensive acid resistant process equipment. This is due to the strongly acidic nature of the ingredients used therein, e.g. the catalyst and the carboxylic acid reactants. Furthermore tertiary olefinic reactants tend to polymerize under strongly acidic catalyst conditions which result in a substantial loss of the tertiary olefin for conversion into the tertiary ester. In addition these strong acid catalysts are difficult to remove from the reaction mixture.

One advantage of our method over the past method of forming tertiary esters is that our method employs essentially non-acidic materials and therefore does not require expensive corrosion resistant reaction equipment. A second advantage is consumption of the reactants in side reactions, such as polymerization, is eliminated and therefore the reactants are more economically utilized. A third advantage is the novel method produces a valuble by-product, namely, ketones.

The process of this invention for preparing tertiary esters broadly comprises reacting carbon monoxide with a di-t-hydrocarbyl peroxide of the formula

wherein R, R' and R" are hydrocarbyl radicals selected from the group consisting of alkyl, aryl, alkaryl and aralkyl having up to nine carbon atoms under conditions of agitation at an elevated temperature and pressure in the presence of an inert organic diluent and optionally in the presence of a transition metal salt as catalyst.

More specifically, in the reaction system a substantial excess of gaseous carbon monoxide reactant is employed. Maintenance of said excess is accomplished by keeping the reaction system under a carbon monoxide pressure of between about 200 and 50,000 p.s.i.g. Pressures between 600 and 5000 p.s.i.g. have been found particularly advantageous. Carbon monoxide pressures below about 200 p.s.i.g. do not permit sufficiently high concentrations of carbon monoxide for reaction with the peroxide or its decomposition intermediates to produce significant yields of desired product. Carbon monoxide pressures above about 50,000 p.s.i.g. are not economical from the standpoint of additional yield of product versus the cost of process equipment entailed by such extreme pressures.

The reaction temperatures employed are desirably between about 190 and 360° F., preferably between 220 and 325° F. At temperatures below about 190° F. the rate of peroxide-monoxide reaction is too slow to yield practical rates of product formation. At reaction temperatures above about 325° F. uncontrollable decomposition of the peroxide reactant results and also any formed ester products tend to decompose.

In order to obtain a measurable yield of tertiary ester a liquid diluent must be utilized in the reaction. Liquid diluents which we have found satisfactory are the inert organic liquids having a boiling point between about 85 and 450° F. The amount of diluent employed in the reaction is desirably in a volume ratio to peroxide reactant of between about 50:1 and 1:1, preferably between 15:1 and 2:1. Specific examples of diluents contemplated herein are the liquid paraffins and aromatic hydrocarbons such as pentane, heptane, isooctane, xylene, benzene, toluene and ethylbenzene.

The use of transition metal salts as catalysts in the method of the invention is desirable for optimum yields of ester. However reduced yields of ester can be produced in the absence of catalyst. If catalyst is employed, the amount utilized is advantageously between about 0.01 and 5 mole percent, preferably between 0.5 and 2 mole percent, based on the peroxide reactant. Catalysts amounts below about 0.01 mole percent do not significantly improve the yield of ester product and additional catalyst amounts above about 5 mole percent do not significantly increase the yield of ester. Specific examples of the transition metal salts contemplated herein are the halides, carboxylates and nitrates of copper, cobalt, manganese, iron and vanadium such as cuprous chloride, cobaltous chloride, ferric nitrate, manganous nitrate and vanadic triacetate.

In addition to the foregoing it has been found that the liquid phase of the reaction mixture must be agitated, e.g., by mechanical stirring, gas circulation or recycling, throughout the entire reaction in order to prevent the uncontrollable decomposition of the peroxide reactant. Uncontrollable decomposition of the peroxide reactant results in practically no yield of ester product.

The tertiary acetate product can be recovered from the reaction mixture by any standard means such as fractional distillation.

In the reaction procedure the peroxide and carbon monoxide reactants employed can be in a pure or in an impure form. For example, t-butyl alcohol is often an impurity in commercially available di-t-butyl peroxide. This impurity does not detrimentally effect the operation of our method.

EXAMPLE I

To a 1.53 liter stainless steel autoclave equipped with a motor driven stirrer and capable of withstanding pressures up to 10,000 p.s.i.g. there was charged di-t-butyl peroxide, solvent and catalyst and subsequently pressured with carbon monoxide at room temperature. The resultant mixture was then heated and maintained at the desired temperature for the desired time. The reaction mixture was then cooled to room temperature, the autoclave vented to the atmosphere pressure and the liquid reaction products removed therefrom. The liquid products were analyzed with a mass spectrometer either before or after being fractionated. The data and results derived from laboratory runs utilizing the foregoing procedure are reported below in Table I:

Table 1

| Run [1] No. | Pure DtBP,[2] moles | Solvent, (mls.) | Reaction Stirring | Catalyst, 1.4 Mole, percent Based on Pure DtBP[2] | Temp., °F. | Starting CO Reaction Pressure, p.s.i.g. | Reaction Time, hrs. | Percent Yield TBA[3] Based on DtBP[2] Charged |
|---|---|---|---|---|---|---|---|---|
| A | .84 | Benzene (500) | Yes | $Cu_2Cl_2$ | 235–320 | 3,000 | 1 | 33 |
| B | .84 | Benzene (500) | Yes | $Cu_2Cl_2$ | 240–290 | 820 | 0.5 | 31 |
| C | .42 | Isooctane (250) | Yes | $Cu_2Cl_2$ | 247–306 | 3,000 | 1.7 | 27 |
| D | .42 | Benzene (250) | Yes | $CoCl_2.6H_2O$ | 242–305 | 3,000 | 1 | 25 |
| E | .50 | Benzene (250) | Yes | None | 280–305 | 820 | 2.5 | 10 |
| F | .50 | Benzene (250) | Yes | None | 255–305 | 3,000 | 2.5 | 6.2 |
| G | .84 | None | Yes | $Cu_2Cl_2$ | 235–320 | 820 | 1 | <1.0 |
| H | .50 | Benzene (250) | No | None | ([4]) | 820 | 4 | 3 |

[1] The DtBP reactant in Runs A, B, C, D and G contained t-butyl alcohol as impurity. In Run Nos. A, B and G this impurity content was 0.31 mole. In Run Nos. C and D this impurity content was 0.15 mole.
[2] DtBP = di-t-butyl peroxide.
[3] TBA = t-butyl acetate.
[4] Temperature reached 284° F., rose suddenly to 425° F. and dropped back to an average temperature of 300° F.

An example of impure carbon monoxide that may be used in our method is synthesis gas. This gas is generally prepared by the combustion of metallurgical coke with air or by the partial oxidation of carbon-containing substance with oxygen or air to make substantial quantities of hydrogen in connection with the production of carbon monoxide. The resultant synthesis gas normally has a content of from 0.2 to 4 volumes of carbon monoxide per volve of diluent, e.g. hydrogen, nitrogen or the like, and small amounts of carbonyl sulfide, hydrogen sulfide and associated sulphurous impurities which are frequently present in the carbon monoxide bearing streams.

The method of the invention can be either batch, continuous or a combination of a batch and continuous process. In the latter two processes the reactants, catalysts and formed products are passed through the reaction zone and continuously recycled therethrough with a continuous or batch withdrawal of the reaction mixture for the separation of the ester product therefrom and the subsequent return of the catalyst (if slurry) and unreacted reactants and intermediates to the circulating reaction system. The components comprising the withdrawn stream can be separated from one another by any standard means such as gas separation, fractionation and filtration. In addition it is also desirable to admix the reactants and catalysts (if slurry) prior to the exposure to the reaction zone in a continuous process.

Since the reaction is conducted under pressure the walls of the reaction vessels should be constructed of pressure resistant material such as cast iron and steel. Since the reaction is not acidic in nature the more expensive reaction vessels made of highly corrosion resistant materials such as austenitic stainless steel, high chrome stainless steel and the like need not be employed.

The subsequent example shows ways in which our invention has been practiced but should not be construed as limiting the invention:

As can be seen from the foregoing table the method of the invention permits the production of a tertiary ester in yields of upwards of 33%. Furthermore Table I shows the omission of solvent, stirring and catalyst as well as the use of reaction temperatures above the stated maximum result in a material reduction of yield of tertiary ester.

We claim:

1. A method of producing a tertiary ester of a carboxylic acid comprising contacting with agitation carbon monoxide and a di-t-hydrocarbyl peroxide of the formula (RR'R")C—O—O—C(RR'R") wherein R, R', and R" are hydrocarbyl radicals selected from the group consisting of alkyl, aryl, alkaryl, and aralkyl having up to nine carbon atoms, said contacting conducted at a temperature between about 190 and 360° F., at a pressure between about 200 and 50,000 p.s.i.g. in the presence of an inert organic liquid diluent, said diluent and said peroxide being present in a volume ratio of between about 50:1 and 1:1.

2. A method of producing t-butyl acetate comprising contacting di-t-butyl peroxide and carbon monoxide with agitation in the presence of inert organic liquid diluent in a volume ratio of said diluent to said peroxide of between about 50:1 and 1:1, at a temperature between about 190° and 360° F. and under a carbon monoxide pressure of between about 200 and 50,000 p.s.i.g.

3. A method in accordance with claim 2 wherein said contacting is conducted in the presence of between 0.01 and 5 mole percent of a transition metal salt catalyst based on said peroxide.

4. A method in accordance with claim 3, wherein said catalyst is cuprous chloride.

5. A method in accordance with claim 3 wherein said catalyst is cobaltous chloride.

6. A method of producing t-butyl acetate comprising contacting di-t-butyl peroxide and carbon monoxide with agitation in the presence of catalyst and an inert organic liquid diluent having a boiling point between about 85 and 450° F., said catalyst selected from the group consisting of cuprous chloride and cobaltous chloride, said contacting conducted at a temperature between 220 and 325° F. and a carbon monoxide pressure between 600 and 5000 p.s.i.g., said diluent being present in a volume ratio to said peroxide between 15:1 and 2:1 and said catalyst being present in an amount between 0.5 and 2 mole percent based on said peroxide.

7. A method in accordance with claim 6 wherein said diluent is selected from the group consisting of benzene and isooctane.

References Cited in the file of this patent
UNITED STATES PATENTS 2,989,563    Jones et al. _____ June 20, 1961